(12) United States Patent
Pratt et al.

(10) Patent No.: US 6,649,868 B2
(45) Date of Patent: *Nov. 18, 2003

(54) WORKPIECE ENCLOSURE SYSTEM AND ROBOTIC LASER PROCESSING SYSTEM INCLUDING PASS THROUGH PARTITIONS

(75) Inventors: Vanon David Pratt, Blanchester, OH (US); Lorne Weeter, Springboro, OH (US)

(73) Assignee: Motoman, Inc., West Carrollton, OH (US)

(*) Notice: Subject to any disclaimer, the term of this patent is extended or adjusted under 35 U.S.C. 154(b) by 50 days.

This patent is subject to a terminal disclaimer.

(21) Appl. No.: 09/878,754

(22) Filed: Jun. 11, 2001

(65) Prior Publication Data

US 2001/0054607 A1 Dec. 27, 2001

Related U.S. Application Data

(63) Continuation-in-part of application No. 09/798,353, filed on Mar. 2, 2001, now abandoned.
(60) Provisional application No. 60/186,736, filed on Mar. 3, 2000.

(51) Int. Cl.$^7$ .............................................. B23K 26/12
(52) U.S. Cl. .............................. 219/121.86; 219/121.82
(58) Field of Search .......................... 219/121.86, 121.6, 219/121.82, 121.83

(56) References Cited

U.S. PATENT DOCUMENTS

| | | | | |
|---|---|---|---|---|
| 3,775,586 A | * | 11/1973 | Flint et al. | 219/121.63 |
| 4,205,216 A | * | 5/1980 | Douglas | 219/121.6 |
| 5,183,993 A | * | 2/1993 | Sato et al. | 219/121.82 |
| 5,274,212 A | * | 12/1993 | Campbell et al. | 219/121.86 |
| 5,464,963 A | * | 11/1995 | Hostler et al. | 219/121.82 |
| 5,591,361 A | | 1/1997 | Hostler et al. | |
| 5,643,477 A | | 7/1997 | Gullo et al. | |
| 5,658,476 A | * | 8/1997 | Gullo et al. | 219/121.86 |
| 6,147,320 A | | 11/2000 | Bernecker et al. | |
| 6,147,323 A | * | 11/2000 | Erickson et al. | 219/121.86 |
| 6,314,686 B1 | * | 11/2001 | Scherer et al. | 52/36.1 |
| 6,347,733 B1 | * | 2/2002 | Hickey, II | 228/49.1 |

* cited by examiner

*Primary Examiner*—M. Alexandra Elve
*Assistant Examiner*—Kevin P. Kerns
(74) *Attorney, Agent, or Firm*—Killworth, Gottman, Hagan & Schaeff, L.L.P.

(57) ABSTRACT

A light-tight laser enclosure system including an enclosure, a robotic laser, first and second pass through partitions, and first and second rotary positioners. The robotic laser is positioned within an interior volume of the enclosure and defines a processing envelope. The first pass through partition defines a first passage in selective communication with interior and exterior volumes of the enclosure, and is configured to maintain a light-tight configuration as the first passage is placed in selective communication with the interior and exterior volumes. The second pass through partition defines a second passage in selective communication with interior and exterior volumes of the enclosure, and is configured to maintain a light-tight configuration as the second passage is placed in selective communication with the interior and exterior volumes. The first and second rotary positioners are configured to secure a workpiece within the first and the second passages, respectively.

27 Claims, 3 Drawing Sheets

WORKPIECE ENCLOSURE SYSTEM AND ROBOTIC LASER PROCESSING SYSTEM INCLUDING PASS THROUGH PARTITIONS

CROSS-REFERENCE TO RELATED APPLICATIONS

This application is a continuation-in-part of U.S. patent application Ser. No. 09/798,353 filed Mar. 2, 2001, now abandoned, which claims the benefit of U.S. Provisional Application Serial No. 60/186,736, filed Mar. 3, 2000. This application is also related to U.S. patent application Ser. No. 09/880,684 filed Jun. 13, 2001, which is a continuation-in-part of U.S. patent application Ser. No. 09/798,698 filed Mar. 2, 2001, now abandoned.

BACKGROUND OF THE INVENTION

The present invention relates to robotic laser processing systems and, more particularly, to a light-tight robotic laser processing system employing a specialized pass through partition arrangement. The invention also relates on a more general level to a materials handling enclosure scheme.

Robotic lasers are commonly used to process workpieces. Most commonly, workpieces are cut to predefined specifications utilizing high-powered robotically controlled lasers. Care is commonly taken to ensure the safety of persons in the vicinity of these types of lasers by enclosing the robots, lasers, and workpieces in light-tight, or nearly light-tight, enclosures. Unfortunately, these precautions commonly increase design and manufacturing costs and processing time. Accordingly, there is a continuing drive to design enclosures and processing systems that are less expensive to design and manufacture and that optimize process efficiency.

BRIEF SUMMARY OF THE INVENTION

This need is met by the present invention wherein a laser processing workpiece enclosure system is provided including a pair of specially designed pass through partitions. In accordance with one embodiment of the present invention, a workpiece enclosure system is provided including an enclosure, first and second pass through partitions, and first and second rotary positioners. The first pass through partition defines a first passage in selective communication with interior and exterior volumes of the enclosure. The first pass through partition is configured to maintain a light-tight configuration as the first passage is placed in selective communication with the interior and exterior volumes of the enclosure. The second pass through partition defines a second passage in selective communication with interior and exterior volumes of the enclosure. The second pass through partition is configured to maintain a light-tight configuration as the second passage is placed in selective communication with the interior and exterior volumes of the enclosure. The first rotary positioner is configured to secure a workpiece within the first passage. The second rotary positioner is configured to secure a workpiece within the second passage.

The workpiece enclosure system preferably further include a controller programmed to place the first and second pass through partitions in selective communication with the interior and exterior volumes of the enclosure and a robotic laser positioned within the enclosure. The first and second pass through partitions are preferably each positioned within an operating envelope of the robotic laser. The controller may be programmed to control the pass through partitions and the robotic laser to execute a load/process/ unload sequence at each of the first and second pass through partitions.

Each of the first and second pass through partitions may comprise a rotary inner nesting member and a stationary outer nesting member defining the first or second passage. Alternatively, the first and second pass through partitions may comprise first and second inner and outer light-tight pass through doors.

According to another embodiment of the present invention, a light-tight laser enclosure system is provided comprising an enclosure, a robotic laser, first and second pass through partitions, and first and second rotary positioners. The robotic laser is positioned within an interior volume of the enclosure and defines a processing envelope. The first pass through partition defines a first passage in selective communication with interior and exterior volumes of the enclosure. The first pass through partition is configured to maintain a light-tight configuration as the first passage is placed in selective communication with the interior and exterior volumes of the enclosure. The second pass through partition defining a second passage in selective communication with interior and exterior volumes of the enclosure. The second pass through partition is configured to maintain a light-tight configuration as the second passage is placed in selective communication with the interior and exterior volumes of the enclosure. The first rotary positioner is configured to secure a workpiece within the first passage. The second rotary positioner configured to secure a workpiece within the second passage.

According to yet another embodiment of the present invention, a light-tight laser enclosure system is provided comprising an enclosure, a robotic laser, first and second pass through partitions, first and second rotary positioners and a controller. The robotic laser is positioned within an interior volume of the enclosure and defines a processing or operating envelope. The first pass through partition defines a first passage in selective communication with interior and exterior volumes of the enclosure. The first pass through partition is configured to maintain a light-tight configuration as the first passage is placed in selective communication with the interior and exterior volumes of the enclosure. The second pass through partition defines a second passage in selective communication with interior and exterior volumes of the enclosure. The second pass through partition is configured to maintain a light-tight configuration as the second passage is placed in selective communication with the interior and exterior volumes of the enclosure. The first rotary positioner is configured to secure a workpiece within the first passage. The second rotary positioner is configured to secure a workpiece within the second passage. The controller is programmed to (i) place the first and second pass through partitions in selective communication with the interior and exterior volumes of the enclosure, (ii) coordinate control of the first and second rotary positioners with control of the robotic laser, (iii) input respective open and closed state signals for the first and second pass through partitions, (iv) initiate robotic laser processing of a workpiece secured in the first passage after input of an open state signal corresponding to the first pass through partition, and (v) initiate robotic laser processing of a workpiece secured in the second passage after input of an open state signal corresponding to the second pass through partition.

Accordingly, it is an object of the present invention to provide an improved laser processing workpiece enclosure system. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
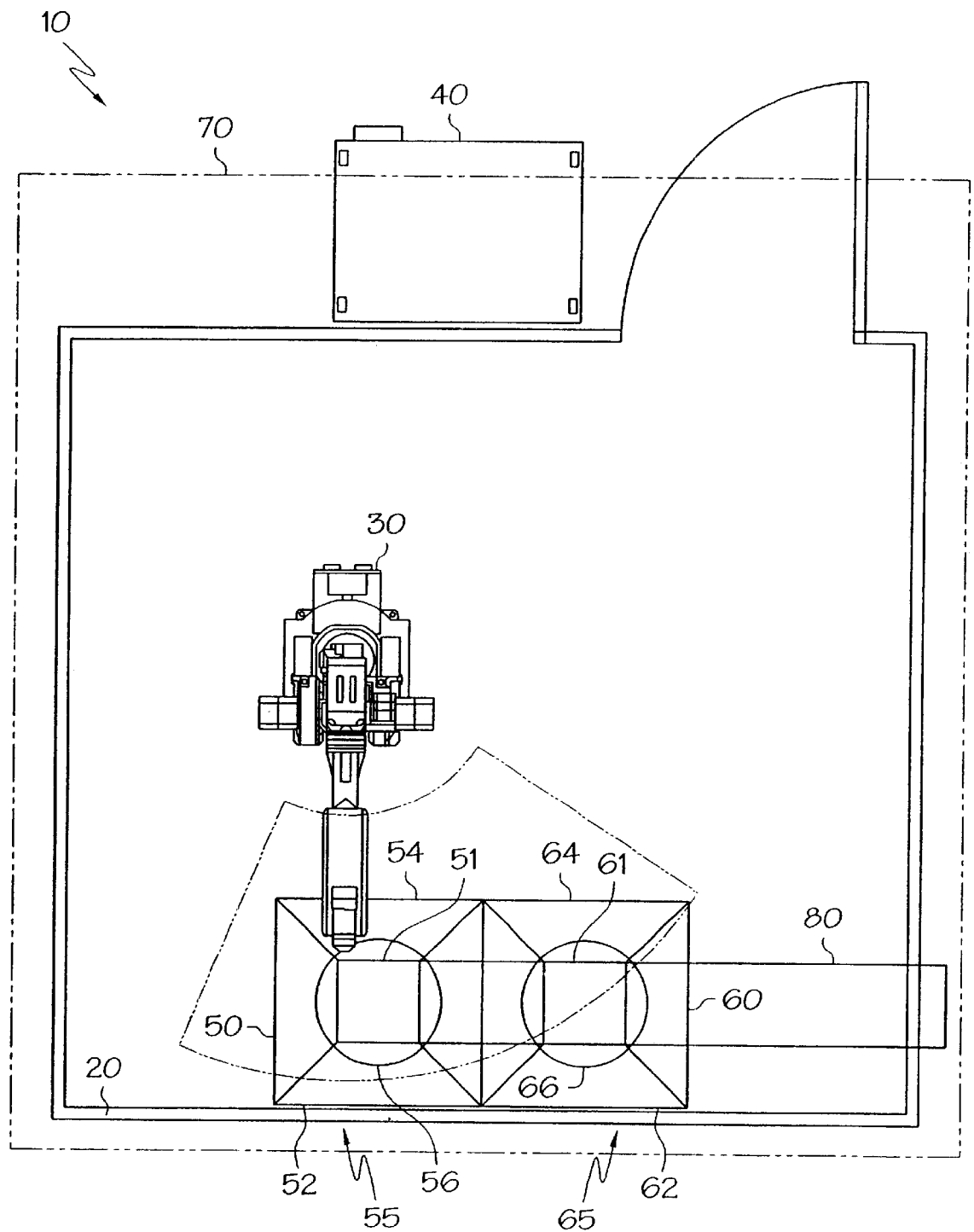
FIG. 1 is a schematic plan view of a laser processing workpiece enclosure system according to one embodiment of the present invention.
Figure 2:
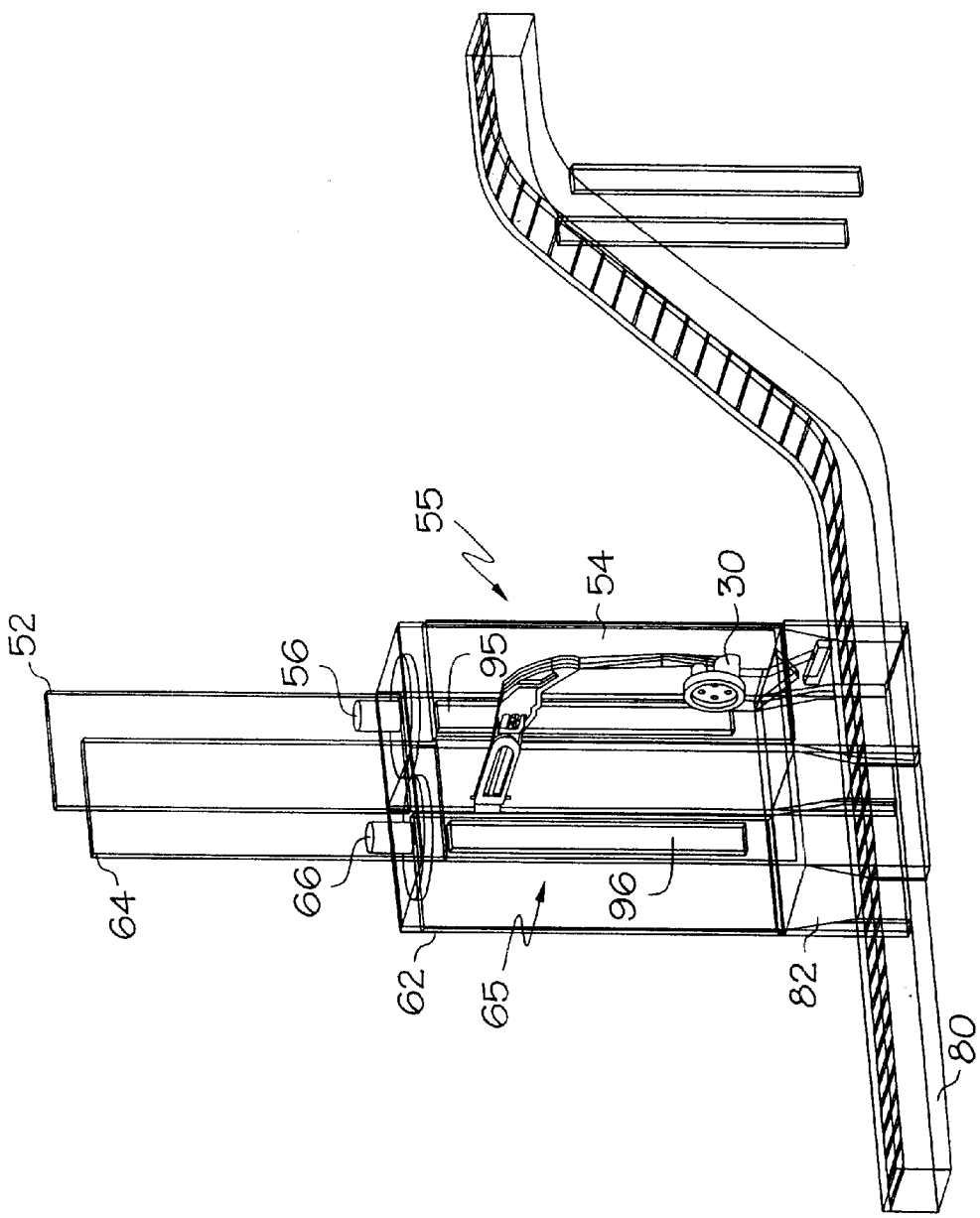
FIG. 2 is a schematic isometric view of selected portions of a laser processing workpiece enclosure system according to one embodiment of the present invention.
Figure 3A:
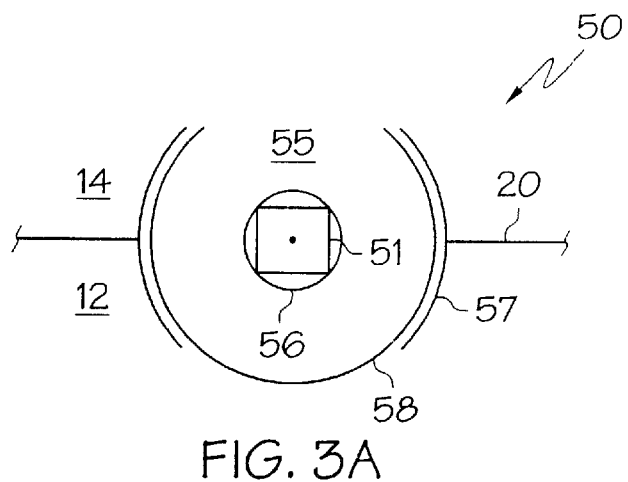
FIGS. 3A–3C are schematic illustrations of an alternative pass through partition according to the present invention.
Figure 3B:
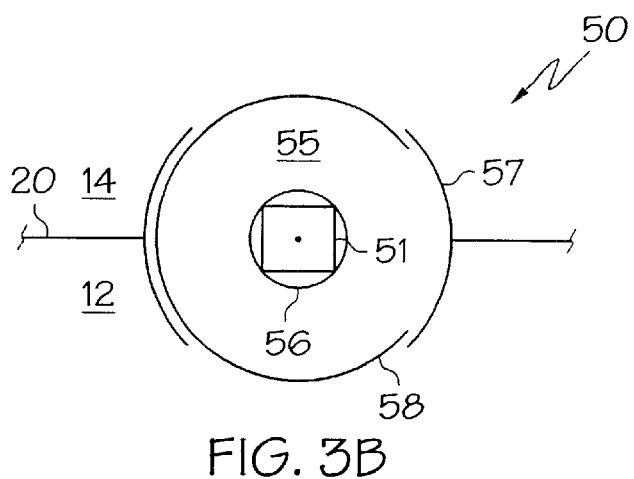
Figure 3C:
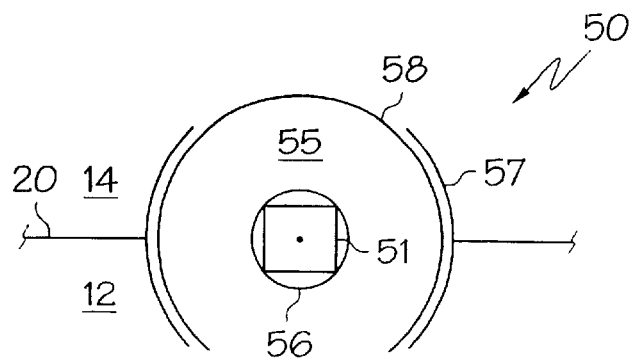

Referring collectively to FIGS. 1–3, a robotic laser processing workpiece enclosure system 10 according to one embodiment of the present invention is illustrated. The robotic laser processing system 10 includes a laser enclosure 20, a robotic laser 30, a programmable robot controller 40, two pass through partitions 50, 60, an optional mezzanine 70, and a scrap conveyor 80. Each pass through partition 50, 60 defines a passage 55, 65 in selective communication with an interior volume 12 (see FIGS. 3A–3C) of the enclosure and includes a light-tight outer pass through door 52, 62 and a light-tight inner pass through door 54, 64. Rotary positioners 56, 66 are associated with each pass through partition 50, 60 and are arranged to hold and rotatably position a workpiece 95, 96 within each partition 50, 60. A material handling robot (not shown) may be arranged to load and unload workpieces 95, 96 to and from the pass through partitions 50, 60. The respective operations of one or more of the robotic laser 30, the pass through doors 52, 62, 54, 64, the rotary positioners 56, 66, and the material handling robot are controlled by the robot controller 40.

For the purposes of defining and describing the present invention, it is noted that a "light-tight" structure, partition, enclosure, or other mechanical element is light-tight in the sense that it is arranged to inhibit passage of all or at least a significant amount of electromagnetic energy. A light-tight element may inhibit passage of electromagnetic energy on its own or through cooperation with another element. A light-tight element or structure need not inhibit passage of all electromagnetic radiation. Rather, light-tight elements or structures need only inhibit passage of an amount of radiation sufficient to meet the particular requirements of the application at hand. For example, it is common for an enclosure to be referred to as light-tight if electromagnetic radiation within the enclosure is forced to reflect off of at least three surfaces before passing to the exterior of the enclosure.

The pass through doors 52, 62, 54, 64 and the pass through partitions 50, 60 are constructed to preserve the light-tight barrier between the interior of the laser enclosure 20 and the exterior of the laser enclosure 20. The laser enclosure 20, the pass through doors 52, 62, 54, 64, and the pass through partitions 50, 60 are also designed to limit the escape of fumes from the laser enclosure. In this manner, the robotic laser processing system 10 of the present invention may be operated to contain harmful laser light and dangerous fumes within the laser enclosure 20. The fumes are preferably exhausted from the laser enclosure 20 in a controlled manner.

In operation, the material handling robot loads a workpiece 95, e.g., an automotive frame cross member or side member, through a selected outer pass through door 52 to the interior of the corresponding pass through partition 50 where it is received by the rotary positioner 56. The rotary positioners 56, 66 are provided to rotate the workpieces 95, 96 as needed to present various sides of the workpiece to the robot 30 for laser processing. The operational steps associated with the laser processing operation are described in detail below.

The inner pass through door 54 is maintained in a closed position as the workpiece is loaded into the pass through partition 50. The outer pass through door 52 is closed once the workpiece 95 is received by the rotary positioner 56 and the operator or material handling robot is clear of the outer pass through door 52. Subsequently, the inner pass through door 54 is opened to allow the robotic laser 30 to access the workpiece 95. A laser processing operation is effected on the workpiece 95 with the inner pass through door 54 in the open position and with both the outer pass through door 52 and either the additional inner pass through door 64 or the additional outer pass through door 62 in the closed positions. In this manner, harmful laser light and dangerous fumes are contained within the laser enclosure 20 while the laser processing operation is affected on the workpiece 95.

An additional workpiece 96 may be loaded into the additional pass through partition 60 while the laser processing operation is effected on the workpiece 95 if the additional outer pass through door 62 is placed in the open position while the additional inner pass through door 64 is maintained in the closed position. Upon loading, the outer pass through door 62 is closed, the inner pass through door 64 is opened, the robotic laser 30 is moved from the pass though partition 50 to the additional pass through partition 60, and the inner pass through door 54 is closed. In this manner, the robotic laser 30 may move from one processing sequence to the next on successive workpieces without delay. Similar steps are subsequently repeated in sequence to effect continuous loading of one workpiece into one pass through partition while a workpiece in an opposite pass through partition is subject to a laser processing operation.

It is important to note that the pass through doors 52, 62, 54, 64 are controlled to maintain a light-tight seal between the interior volume 12 of the enclosure 20 and the exterior of the enclosure 20 while workpieces are loaded, unloaded, and subject to laser processing. Specifically, the controller 40 is programmed to open and close selectively the inner and outer pass through doors 52, 62, 54, 64 while maintaining a light-tight configuration characterized by closure of at least one of the inner and outer doors 52, 62, 54, 64 associated with each of the passages 55, 65. To do so, the controller 40 is programmed to input respective open and closed state signals for each of the first and second inner and outer pass through doors 52, 62, 54, 64 and allow opening of a pass through for a selected passage only upon input of a closed state signal for the corresponding door associated with the selected passage. More specifically, the controller is programmed to (i) open the first outer pass through door 52 in response to a closed state signal corresponding to the first inner pass through door 54, (ii) open the first inner pass through 54 door after input of a closed state signal corresponding to the first outer pass through door 52, (iii) open the second outer pass through door 62 after input of a closed state signal corresponding to the second inner pass through door 64, and (iv) open the second inner pass through door 64 after input of a closed state signal corresponding to the second outer pass through door 62.

The controller 40 is preferably additionally programmed to initiate robotic laser processing of a workpiece when the appropriate inner pass through door is open. More specifically, the controller 40 may be programmed to initiate robotic laser processing of the workpiece 95 secured in the first passage 55 after input of an open state signal corresponding to the first inner pass through door 54 and to initiate robotic laser processing of a workpiece 96 secured in the second passage 65 after input of an open state signal corresponding to the second inner pass through door 64. The controller 40 may also be programmed to coordinate control of the first and second rotary positioners 56, 66 with control of the robotic laser 30. The rotary positioners 56, 66 may be arranged to generate signals indicative of whether a workpiece has been received.

Stated differently, the controller 40 is programmed to control the pass through partitions 50, 60 and the robotic laser 30 to execute a load/process/unload sequence at each of the first and second pass through partitions 50, 60. The load/process/unload sequence at the first pass through partition 50 is coordinated with the load/process/unload sequence at the second pass through partition 60 to ensure that a workpiece is loaded and ready for processing by the time a neighboring workpiece in the adjacent pass through partition has been processed completely. The load and unload portions of the sequence correspond to communication of a selected pass through partition with the exterior volume 14 (see FIGS. 3A–3C). The process portion of the sequence corresponds to communication of a selected pass through partition with the interior volume 12.

For the purposes of describing and defining the various arrangements of the inner and outer doors of the present invention, it is noted that a light-tight configuration is a configuration characterized by closure of at least one door associated with each passages. If both the inner and outer doors of a passage are in the open state light may pass freely from the enclosure through the passage. However, in a light-tight configuration, where at least one of the doors in each passage are closed, light may not pass through either passage to the exterior of the enclosure. Where a controller is described or recited in a claim in the present application as being programmed to perform a particular operation, it is noted that the controller commonly performs the operation in cooperation with controllable hardware. For example, although the controller of the present invention is recited herein as being programmed to open a pass through door, it should be clear to those practicing the present invention that the controller will likely have to cooperate with some kind of door opening hardware to actually open the pass through door.

The scrap conveyor 80 and a scrap chute 82 are provided to receive scrap material generated during the laser processing operation and convey the scrap material to the exterior of the enclosure. The conveyor 80 is provided with a suitable light-tight hood to ensure proper containment of laser light.

The specific structure and design of the robotic laser, the scrap conveyor, and the servo rotary positioner are not the subject of the present invention and may be gleaned from conventional material handling technology in light of the particular requirements of the specific laser processing application. A suitable robotic laser is available from Motoman, Inc. (Troy, Ohio), under the product identifier SK16X suitable servo rotary positioner is also available from Motoman, Inc., under the product identifier MH-340.

Certain aspects of the laser processing system of the present invention may be altered in design without departing from the scope of the present invention. For example, the pass through doors could be arranged to open and close horizontally or radially, as opposed to vertically. In addition, the pass through partitions 50, 60 may comprise rotary dark room style doors, an example of which is illustrated in FIGS. 3A–3C. As is illustrated in FIGS. 3A–3C, a rotary pass through partition 50 may be employed to maintain a light-tight configuration. Specifically, the rotary pass through partition 50 includes stationary outer nesting member 57 and a rotary inner nesting member 58 defining a passage 55 in selective communication with an interior volume 12 of the enclosure 20. The outer nesting member 57 is illustrated in schematic cross section in FIG. 3A and includes opposite nesting member portions enclosing opposite sides of the inner nesting member 58. The opposite nesting member portions may be connected to each other, may form portions of a single mechanical component, or may comprise separate components cooperating to function collectively as the outer nesting member 57. A rotary positioner 56 is arranged to hold and rotatably position a workpiece within the partition 50.

In the orientation illustrated schematically in FIG. 3A, the inner nesting member 58 is positioned to communicate with the exterior of the laser enclosure 20 while maintaining a light-tight configuration, with respect to the interior of the enclosure 20. The passage 55 may then be placed in communication with the interior of the enclosure 20 by rotating the inner nesting member 58 through approximately 180 degrees. As FIGS. 3A–3C illustrate, the outer and inner nesting members 57, 58 are designed to maintain the light-tight configuration through the allowable range of rotation of the inner member 58.

As will be appreciated by those practicing the present invention, where the outer and inner nesting members 57, 58 are employed to form the pass through partitions 50, 60, the robot controller 40 will not be able to input open and closed state signals for the inner and outer pass through doors, as described above. Rather, the controller 40 should be programmed to input respective load/unload and processing state signals for the first and second pass through partitions. As is noted above, the load/unload state signal will correspond to communication of a selected pass through partition with the exterior volume 14. The processing state signal will correspond to communication of a selected pass through partition with the interior volume 12. Robotic laser processing of a workpiece secured in the first passage 55 will be initiated after input of a processing state signal corresponding to the first pass through partition 50. Similarly, robotic laser processing of a workpiece secured in the second passage 65 will be initiated after input of a processing state signal corresponding to the second pass through partition 60. It is contemplated that the load/unload and processing state signals may also be utilized to characterize the various open and closed states of the embodiment of the present invention utilizing the inner and outer pass through doors.

A plurality of robotic lasers may be provided within the enclosure 20. In addition, more than two pass through partitions 50, 60 may be provided in the laser enclosure 20. Each of the plurality of pass through partitions 50, 60 may be accessible by a single robotic laser 30 or by different robotic lasers. Similarly, where a plurality of robotic lasers 30 are provided, each of the robotic lasers may be arranged to access different or common ones of the pass through partitions 50, 60.

A vision inspection system may be provided by mounting video imaging devices 51, 61 within one or both of the pass through partitions 50, 60. Preferably, to enhance image production, the video imaging device would be positioned to view a side of a workpiece 95, 96 positioned away from the robotic laser 30.

Having described the invention in detail and by reference to preferred embodiments thereof, it will be apparent that modifications and variations are possible without departing from the scope of the invention defined in the appended claims. For example, it is contemplated that the enclosure scheme of the present invention will have applications in addition to the specific laser processing application discussed herein.

Although some aspects of the present invention are identified herein as preferred or particularly advantageous, it is contemplated that the present invention is not necessarily limited to these preferred aspects of the invention.

What is claimed is:

1. A workpiece enclosure system comprising:
   an enclosure;
   a first pass through partition defining a first passage in selective communication with interior and exterior volumes of said enclosure, wherein said first pass through partition is configured to maintain a laser light-tight configuration as said first passage is placed in selective communication with said interior and exterior volumes of said enclosure;
   a second pass through partition defining a second passage in selective communication with interior and exterior volumes of said enclosure, wherein said second pass through partition is configured to maintain a laser light-tight configuration as said second passage is placed in selective communication with said interior and exterior volumes of said enclosure;
   a first rotary positioner configured to secure a workpiece within said first passage; and
   a second rotary positioner configured to secure a workpiece within said second passage.

2. A workpiece enclosure system as claimed in claim 1 wherein said workpiece enclosure system further comprises a controller programmed to place said first and second pass through partitions in selective communication with said interior and exterior volumes of said enclosure and a robotic laser positioned within said enclosure, wherein said first and second pass through partitions are each positioned within an operating envelope of said robotic laser.

3. A workpiece enclosure system as claimed in claim 2 wherein said first and second pass through partitions are positioned adjacent one another.

4. A workpiece enclosure system as claimed in claim 2 wherein said controller is programmed to control said pass through partitions and said robotic laser to execute a load/process/unload sequence at each of said first and second pass through partitions.

5. A workpiece enclosure system as claimed in claim 4 wherein said load/process/unload sequence at said first pass through partition is coordinated with said load/process/unload sequence at said second pass through partition.

6. A workpiece enclosure system as claimed in claim 4 wherein said load portion of said sequence corresponds to communication of a selected pass through partition with said exterior volume, said process portion of said sequence corresponds to communication of a selected pass through partition with said interior volume, and said unload portion of said sequence corresponds to communication of a selected pass through partition with said exterior volume.

7. A workpiece enclosure system as claimed in claim 1 wherein said workpiece enclosure system further comprises a controller programmed to place said first and second pass through partitions in selective communication with said interior and exterior volumes of said enclosure.

8. A workpiece enclosure system as claimed in claim 1 wherein said workpiece enclosure system further comprises a robotic laser positioned within said enclosure.

9. A workpiece enclosure system as claimed in claim 8 wherein said workpiece enclosure system further comprises a controller programmed to coordinate control of said first and second rotary positioners with control of said robotic laser.

10. A workpiece enclosure system as claimed in claim 8 wherein said workpiece enclosure system further comprises a controller programmed to:
    input respective load/unload and processing state signals for said first and second pass through partitions;
    initiate robotic laser processing of a workpiece secured in said first passage after input of a processing state signal corresponding to said first pass through partition; and
    initiate robotic laser processing of a workpiece secured in said second passage after input of a processing state signal corresponding to said second pass through partition.

11. A workpiece enclosure system as claimed in claim 1 wherein each of said pass through partitions comprises a scrap chute formed at a lower portion of each of said partitions.

12. A workpiece enclosure system as claimed in claim 11 wherein each of said scrap chutes is positioned above a scrap conveyor.

13. A workpiece enclosure system as claimed in claim 1 further comprises a scrap conveyor and a scrap chute configured to receive scraps originating from said first and second pass through partitions.

14. A workpiece enclosure system as claimed in claim 1 further comprising a scrap conveyor extending from said interior volume through a conveyor interface with said enclosure to an exterior of said enclosure, wherein said enclosure system is configured to define a laser light-tight barrier at said conveyor interface.

15. A workpiece enclosure system as claimed in claim 1 wherein said enclosure and said pass through partitions are configured to limit escape of fumes from said interior volume of said enclosure.

16. A workpiece enclosure system as claimed in claim 1 further comprising a video imaging device mounted within at least one of said first and second pass through partitions.

17. A workpiece enclosure system as claimed in claim 1 wherein each of said first and second pass through partitions comprise an inner nesting member and an outer nesting member defining one of said first and second passages.

18. A workpiece enclosure system as claimed in claim 17 wherein said outer nesting member comprises a stationary nesting member and said inner nesting member comprises a rotary nesting member.

19. A workpiece enclosure system as claimed in claim 1 wherein said first and second pass through partitions comprise:
    a first laser light-tight inner pass through door defining a boundary between said interior volume and said first passage;
    a first laser light-tight outer pass through door defining a boundary between said first passage and an exterior of said enclosure;
    a second laser light-tight inner pass through door defining a boundary between said interior volume and said second passage;
    a second laser light-tight outer pass through door defining a boundary between said second passage and said exterior of said enclosure.

20. A workpiece enclosure system as claimed in claim 19 wherein said workpiece enclosure system further comprises a controller programmed to:

open and close selectively said inner and outer pass through doors; and maintain a laser light-tight configuration characterized by closure of at least one of said inner and outer doors associated with each of said passages.

21. A workpiece enclosure system as claimed in claim 19 wherein said workpiece enclosure system further comprises a controller programmed to:

input respective closed state signals for each of said first and second inner and outer pass through doors;

open said first outer pass through door after input of a closed state signal corresponding to said first inner pass through door;

open said first inner pass through door after input of a closed state signal corresponding to said first outer pass through door;

open said second outer pass through door after input of a closed state signal corresponding to said second inner pass through door; and open said second inner pass through door after input of a closed state signal corresponding to said second outer pass through door.

22. A workpiece enclosure system as claimed in claim 19 wherein said workpiece enclosure system further comprises a controller programmed to:

input respective closed state signals for each of said first and second inner and outer pass through doors;

open said first inner pass through door after input of a closed state signal corresponding to said first outer pass through door and after input of a closed state signal corresponding to one of said second inner and outer pass through doors: and open said second inner pass through door after input of a closed state signal corresponding to said second outer pass through door and after input of a closed state signal corresponding to one of said second inner and outer pass through doors.

23. A workpiece enclosure system as claimed in claim 22 wherein said workpiece enclosure system further comprises a controller programmed to:

input respective open and closed state signals for each of said first and second inner and outer pass through doors;

open said first inner pass through door after input of a closed state signal corresponding to said first outer pass through door and after input of a closed state signal corresponding to one of said second inner and outer pass through doors;

initiate robotic laser processing of a workpiece secured in said first passage after input of an open state signal corresponding to said first inner pass through door;

open said second inner pass through door after input of a closed state signal corresponding to said second outer pass through door and after input of a closed state signal corresponding to one of said second inner and outer pass through doors; and initiate robotic laser processing of a workpiece secured in said second passage after input of an open state signal corresponding to said second inner pass through door.

24. A light-tight laser enclosure system comprising:

an enclosure;

a robotic laser positioned within an interior volume of said enclosure and defining a processing envelope;

a first pass through partition defining a first passage in selective communication with interior and exterior volumes of said enclosure, wherein said first pass through partition is configured to maintain a light-tight configuration as said first passage is placed in selective communication with said interior and exterior volumes of said enclosure;

a second pass through partition defining a second passage in selective communication with interior and exterior volumes of said enclosure, wherein said second pass through partition is configured to maintain a light-tight configuration as said second passage is placed in selective communication with said interior and exterior volumes of said enclosure;

a first rotary positioner configured to secure a workpiece within said first passage; and a second rotary positioner configured to secure a workpiece within said second passage.

25. A light-tight laser enclosure system comprising:

an enclosure;

a robotic laser positioned within an interior volume of said enclosure and defining a processing envelope;

a first pass through partition defining a first passage in selective communication with interior and exterior volumes of said enclosure, wherein said first pass through partition is configured to maintain a light-tight configuration as said first passage is placed in selective communication with said interior and exterior volumes of said enclosure;

a second pass through partition defining a second passage in selective communication with interior and exterior volumes of said enclosure, wherein said second pass through partition is configured to maintain a light-tight configuration as said second passage is placed in selective communication with said interior and exterior volumes of said enclosure;

a first rotary positioner configured to secure a workpiece within said first passage;

a second rotary positioner configured to secure a workpiece within said second passage; and a controller programmed to place said first and second pass through partitions in selective communication with said interior and exterior volumes of said enclosure, coordinate control of said first and second rotary positioners with control of said robotic laser, input respective open and closed state signals for said first and second pass through partitions, initiate robotic laser processing of a workpiece secured in said first passage after input of an open state signal corresponding to said first pass through partition, initiate robotic laser processing of a workpiece secured in said second passage after input of an open state signal corresponding to said second pass through partition.

26. A workpiece enclosure system comprising:

an enclosure;

a first pass through partition defining a first passage in selective communication with interior and exterior volumes of said enclosure, wherein said first pass through partition comprises a first laser light-tight inner pass through door defining a boundary between said interior volume of said enclosure and said first passage, and a first laser light-tight outer pass through door defining a boundary between said firs passage and said exterior volume of said enclosure;

a second pass through partition defining a second passage in selective communication with interior an exterior volumes of said enclosure, wherein said second pass through partition comprises
  a second laser light-tight inner pass through door defining a boundary between said interior volume of said enclosure and said second passage, and
  a second light-tight outer pass through door defining a boundary between said second passage and said exterior volume of said enclosure;
a first rotary positioner configured to secure a workpiece within said first passage; and
a second rotary positioner configured to secure a workpiece within said second passage.

27. A workpiece enclosure system comprising:

an enclosure;

a first rotary pass through partition defining a first passage in selective communication with interior and exterior volumes of said enclosure;

a second rotary pass through partition defining a second passage in selective communication with interior and exterior volumes of said enclosure, wherein
  each of said first and second rotary pass through partitions comprise a rotary inner nesting member and a stationary outer nesting member defining one of said first and second passages, and
  said inner and outer nesting members of said first and second rotary pass through partitions are dimensioned to maintain a laser light-tight configuration;

a first rotary positioner configured to secure a workpiece within said first passage; and a second rotary positioner configured to secure a workpiece within said second passage.

* * * * *